No. 765,575. PATENTED JULY 19, 1904.
J. A. GOULD.
WHEEL HUB.
APPLICATION FILED MAR. 18, 1903.
NO MODEL.
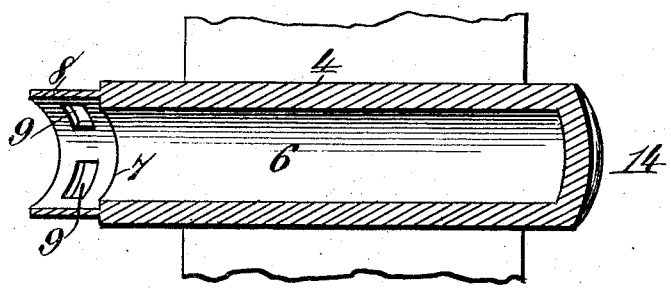
Fig. 1.
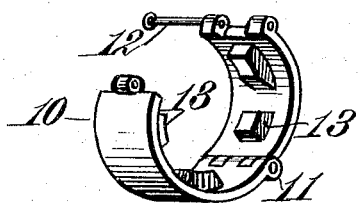
Fig. 2.
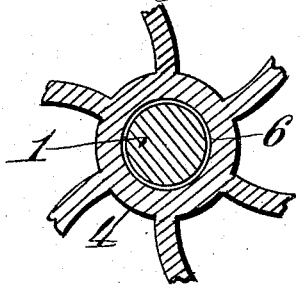
Fig. 4.
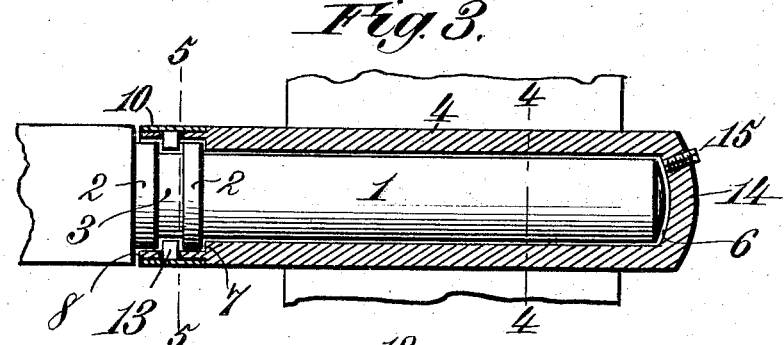
Fig. 3.
Fig. 5.
Witnesses,
Robert Everett.
James L. Norris, Jr.
Inventor,
James A. Gould.
By James L. Norris.
Atty.

No. 765,575.

Patented July 19, 1904.

UNITED STATES PATENT OFFICE.

JAMES A. GOULD, OF YOHOGHANY, PENNSYLVANIA.

WHEEL-HUB.

SPECIFICATION forming part of Letters Patent No. 765,575, dated July 19, 1904.

Application filed March 18, 1903. Serial No. 148,401. (No model.)

*To all whom it may concern:*

Be it known that I, JAMES A. GOULD, a citizen of the United States, residing at Yohoghany, in the county of Westmoreland and State of Pennsylvania, have invented new and useful Improvements in Wheel-Hubs, of which the following is a specification.

This invention relates to wheel-hubs; and one of the objects thereof is to provide improved means for retaining the wheel-hub upon the vehicle-axle.

Other objects and advantages of the invention will be apparent from the following detailed description, and the novel features thereof will be set forth in the claim.

In the accompanying drawings, forming a part of this specification, Figure 1 is a longitudinal sectional view of a hub constructed according to my invention. Fig. 2 is a view showing the divided ring for attaching the hub to the axle. Fig. 3 is a longitudinal section, partly in elevation, showing the hub held in place upon the axle by the divided ring. Fig. 4 is a cross-section on the line 4 4 of Fig. 3, and Fig. 5 is a cross-section on the line 5 5 of Fig. 3.

The vehicle-axle 1 is provided with a pair of integral collars 2, which are located a short distance apart, so as to provide the groove 3 therebetween. The wheel-hub 4 is preferably made in one piece and is hollowed or bored out, as shown at 6, to receive the outer end of the axle 1 and to produce a closed end 14. Interiorly the hub is provided with a shoulder 7, which abuts against the outer collar 2 of the axle 1 when the hub is placed thereon. A thin cylindrical extension 8 is also provided on the inner end of the hub 4, which cylindrical extension projects over the two collars on the axle 1 when the hub is placed upon the axle. The cylindrical extension 8, which is preferably made integral with the hub in order to reduce expense, is provided with a plurality of inwardly-extending slots or cut-away portions 9. Any desired number of these slots or cut-away portions may be provided in the cylindrical extension 8.

The numeral 10 indicates a divided collar, the sections of which are hinged to each other, as shown at 11. A suitable locking device 12 is shown at the opposite side of the divided collar 10, by means of which the sections may be firmly locked together. Each section 10 of the divided collar is provided with a plurality of lugs or projections 13, which correspond in size with the slots or cut-away portions 9 in the cylindrical extension 8 of the hub 4.

By hollowing out the hub 4, as shown at 6, to receive the axle 1 I provide the closed end 14, which produces an oil-receptacle by means of which the wheel-axle is effectually lubricated. A suitable aperture, closed by a screw-plug 15, is made in the end 14 of the hub 4, by means of which oil or other lubricating material may be introduced to the lubricating-chamber formed by the closed end of the hub.

The parts of my improved device are assembled in the following manner: The hub 4 is placed upon the axle 1, so that the cylindrical extension 8 thereon projects over the two collars on the axle. The divided collar 10 is then placed around the cylindrical extension 8 of the hub, the projections 13 on said collar extending through the slots or cut-away portions of said cylindrical extension 8 into the groove 3 between the two collars 2 on the axle 1. The sections of the divided ring 10 are then firmly locked together, as will be readily understood. By means of the lugs 13 projecting through the slots of the cylindrical extension on the hub into the space between the integral collars of the axle 1 the hub is effectually prevented from becoming displaced on the axle 1.

It will be seen that the extension upon the inner end of the hub is of a uniform internal and external diameter throughout its length, whereby the axle can be freely introduced in such extension, and when the collar is applied to the exterior of said extension the outer surface of said collar will be flush with the corresponding portion of the body of the hub.

Though I have described my hub as being made in one piece, it will be obvious that, if desired, I may divide it into two halves or into three or more sections without departing from the spirit of my invention.

My improved wheel-hub with its integral oil-cup is particularly adapted for use upon mining-cars, where durability and simplicity of construction are essential attributes, though it will be obvious that my improvement may be applied to other forms of vehicles than mining-cars.

Having thus described my invention, what I claim as new, and desire to secure by Letters Patent, is—

A cylinder-hub having an extension at its inner end of less internal and external diameter than the body of said hub to present internal and external shoulders, said extension being apertured, and a removable collar surrounding said extension having legs to extend through the apertures in said extension, the external diameter of said collar being the same as that of the body of the hub and the internal and external diameters of said extension being uniform throughout the entire length thereof, whereby when the parts are assembled no projections are present on the peripheries thereof and whereby an axle can be freely introduced into the hub.

In testimony whereof I have hereunto set my hand in presence of two subscribing witnesses.

JAMES A. GOULD.

Witnesses:
V. F. NIRELLA,
NICHOLAS VITORI.